R. A. GALLY.
MUSICAL INSTRUMENT INDICATOR.
APPLICATION FILED JAN. 28, 1916.
1,234,328.
Patented July 24, 1917.
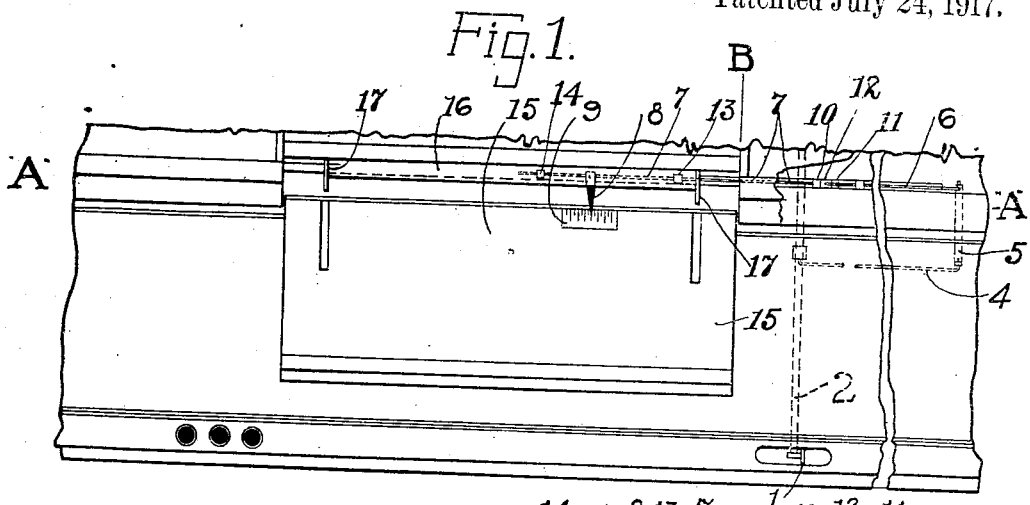
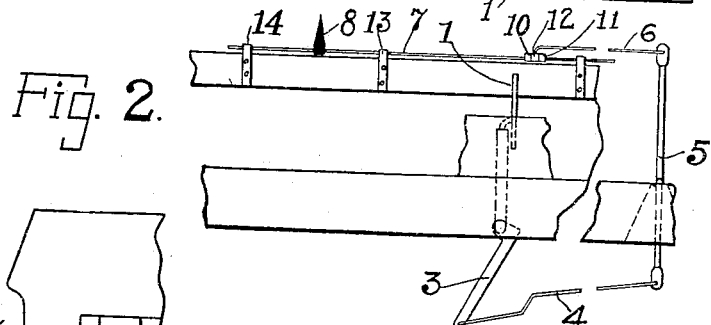
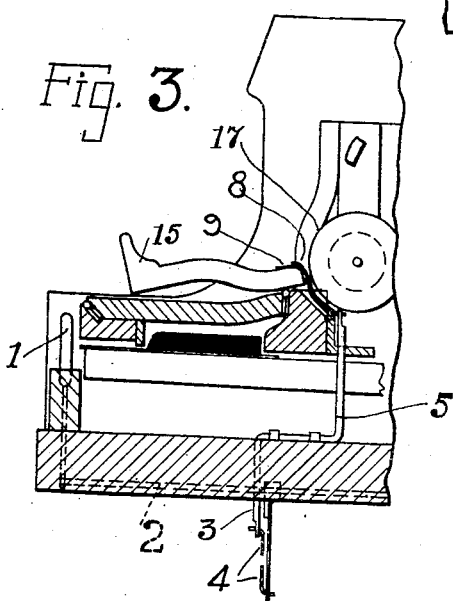
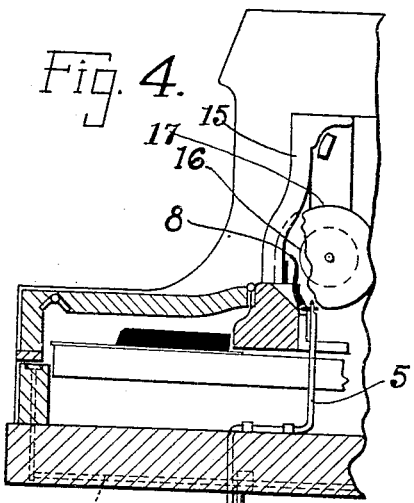
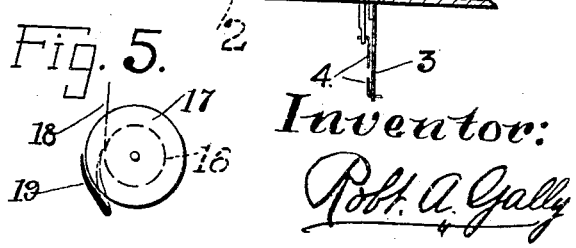
Witnesses:
Herbert G. Moore.
Paul Hengge
Inventor:
Robt. A. Gally

UNITED STATES PATENT OFFICE.

ROBERT A. GALLY, OF CINCINNATI, OHIO, ASSIGNOR TO THE BALDWIN COMPANY, OF CINCINNATI, OHIO.

MUSICAL-INSTRUMENT INDICATOR.

1,234,328.     Specification of Letters Patent.     Patented July 24, 1917.

Application filed January 28, 1916. Serial No. 74,786.

*To all whom it may concern:*

Be it known that I, ROBERT A. GALLY, a citizen of the United States, residing at Cincinnati, in the county of Hamilton and State of Ohio, have invented certain new and useful Improvements in Musical-Instrument Indicators, of which the following is a specification.

In the ordinary upright form of player piano, the box containing the music rolls usually has sufficient room to accommodate the tempo or other expression plate, and the traveling tempo or other expression pointer, adjacent to the take-up spool of the music sheet, but when the space in front of the take-up spool is insufficient for the tempo plate, or the pointer, or both, as, for instance, in player grand pianos, I now make the tempo pointer to swing forward for use, and inward when out of use, and place the indicator plate forward of the pointer, or if the pointer is to coöperate with marks or lines on the music sheet, the indicator plate may be omitted.

In the drawings Figure 1 is a plan view of the improved tempo indicator disposed in the case of a player grand piano having its music roll and fall board parts shown similar to my application #746,751, for purposes of illustration of one embodiment of the present invention; Fig. 2 is a view from the front taken principally in section on line A—A of Fig. 1; Fig. 3 is a view from the right of Fig. 1, taken principally in section on the line B of Fig. 1, with the tempo pointer swung forward; Fig. 4 a similar view with the tempo pointer swung inward, and Fig. 5 is an end view of a modified form of the indicator pointer without the plate.

Any tempo handle as 1 or other expression controlling or actuating means may be connected by suitable connecting means as shaft 2 with its arm 3, cross-wire 4, rocker 5, connecting-wire 6 and pointer rod 7, which rod 7 carries the pointer 8. This pointer rod 7 is free to revolve sufficiently to allow the pointer 8 to move forward and back, that is, to and from the indicator plate 8. This revolution of rod 7 is possible by reason of the revoluble union of the pointer rod 7 and connecting wire 6, such union comprising any suitable means, as two collars 10 and 11 fast on rod 7, and a collar or sleeve 12 attached to the end of wire 6 between and free from said collars 10 and 11 and revoluble on rod 7. The pointer rod 7 is guided in bearings 13 and 14 which permit its longitudinal motion and the corresponding travel of the pointer along the scale of the plate 9.

The indicator plate 9 is shown mounted on the face of a fall board 15 which is turned in toward the music spool 16 when said fall 15 is closed, this fall 15 lying horizontally and in front of the music spool 16 when a music sheet is to be used, the indicator plate 9 then lying in convenient view immediately in front of the music spool 16 with the front end of the pointer 8 lying over or adjacent to the scale degrees of the plate 9.

When the fall 15 is swung forward and down to its horizontal position as shown in Figs. 1 and 3, the pointer 8 drops forward and down toward the fall 15 and plate 9 in position to be followed by the eye as the pointer 8 moves along the plate 9 during the operation of the handle 1 or other controlling or actuating means.

When the fall 15 is swung back and up to close the take-up spool 16 and other parts from view, said fall lifts and swings the pointer 8 up and back close to the take-up spool 16 between its flanges 17. To save all space possible the pointer 8 is of a curved form to conform to the spool 16, and its free end reverse curved to extend over the inner edge of the fall 15 and the indicator plate 9. With such form of pointer, it clears the line of the circumferences of the spool flanges 17.

Instead of the pointer 8 indicating to a plate 9, it may read to marks or indications of a music-sheet 18 as in Fig. 5, where the pointer 19 stands close to the take-up spool 16 when out of use, and is swung slightly forward but remaining adjacent to the music-sheet wound on said spool 16 when the instrument is being played.

The detail of the folding fall-board immediately at the front edge of the manual keys is used merely to complete the illustration of a desirable use of the special indicator device claimed herein, such fall-board detail being claimed in application #72,157, of one Louis Reichling, owned by the same assignees as this present application.

It is to be understood that the improved indicator device claimed herein may have its pointer movement actuated by any other personal control than a handle, or by any mechanical or automatic movement of a musical instrument, whether self-playing or manual, of which a traveling motion visual indication of any movement is desired, also that any style of musical instrument case other than a grand piano may contain the improved indicator; and that the indicator plate may be attached to any suitable part of any such musical instrument other than the fall-board.

What I claim as my invention, is:—

1. In a musical instrument, a visual pointer means, and a mounting combined with said pointer means mounted to permit the travel of said pointer means in a certain direction and to permit a swinging motion of said pointer means in a plane substantially at a right angle to said certain direction and an indicator plate adjacent to said visual pointer means.

2. In a musical instrument, a visual pointer means mounted to travel in a certain direction and also mounted swingingly in a plane substantially at a right angle to said certain direction, and bearing means in which said pointer means is mounted to travel in said certain direction and an indicator plate adjacent to said visual pointer means.

3. In a musical instrument, a fall-board and hinges on which said fall-board is mounted, a visual pointer means mounted to travel adjacent to and parallel to the axial line of said hinges, said pointer also mounted to swing in similar direction to the direction of motion of said fall board on said hinges, and bearing means in which said pointer means is mounted to travel and swing as stated and an indicator plate adjacent to said visual pointer means.

4. In a musical instrument, a fall-board and hinges on which said fall-board is mounted, a visual pointer means mounted to travel adjacent to and parallel to the axial line of said hinges, a bearing means on which said pointer means is mounted and an indicator plate mounted on said fall-board adjacent said pointer.

5. In a musical instrument, a fall-board and hinges on which said fall-board is mounted, a visual pointer means mounted to travel adjacent to and parallel to the axial line of said hinges, a bearing means on which said pointer means is mounted and an indicator plate mounted on said fall-board adjacent said hinges.

6. In a musical instrument, a fall-board and hinges on which said fall-board is mounted, a visual pointer means mounted to travel adjacent to and parallel to the axial line of said hinges, a bearing means on which said pointer means is mounted, said pointer also mounted to swing in similar direction to the direction of motion of said fall-board on said hinges, said fall-board pressing against said pointer when said fall-board is swung toward said pointer and an indicator plate adjacent to said visual pointer means.

7. In a musical instrument, a fall-board and hinges on which said fall-board is mounted, a visual pointer means mounted to travel adjacent to and parallel to the axial line of said hinges, a bearing means on which said pointer means is mounted, said pointer also mounted to swing in similar direction to the direction of motion of said fall on said hinges, said fall-board pressing against said pointer when said fall-board is swung toward said pointer, and said pointer pressing against said fall-board when said fall-board is swung in the direction away from said pointer and an indicator plate adjacent to said visual pointer means.

8. In a musical instrument, a visual pointer means mounted to travel in a certain direction and to also swing in a plane substantially at a right angle to said certain direction, and a bearing means in which said pointer means is mounted to travel in said certain direction, a take-up spool having its axis substantially parallel to said certain direction of travel of the pointer, and flanges at the ends of said spool, said pointer positioned adjacent to said spool and between said flanges and within the line across the outside circumference of said two flanges at one position of its swing motion, and outside the line across the circumference of the two said flanges at another position of its swing motion.

9. In a musical instrument, a visual pointer means mounted to travel in a certain direction and to also swing in a plane substantially at a right angle to said certain direction, and a bearing means in which said pointer means is mounted to travel in said certain direction, a take-up spool having its axis substantially parallel to said certain direction of travel of the pointer, and flanges at the ends of said spool, said pointer disposed adjacent to said spool and between said flanges and within the line across the outside circumference of said two flanges at one position of its swing motion, and outside the line across the circumference of the two said flanges at another position of its swing motion, said pointer including a curve in its form, said curve being of similar direction as the circumference of said spool.

10. In a musical instrument, a visual pointer means mounted to travel in a certain direction and to also swing in a plane substantially at a right angle to said certain direction, and a bearing means in which said pointer means is mounted to travel in said certain direction, a take-up spool having its axis substantially parallel to said certain direction of travel of the pointer, and flanges at the ends of said spool, said pointer disposed adjacent to said spool and between said flanges and within the line across the outside circumference of said two flanges at one position of its swing motion, and outside the line across the circumference of the two said flanges at another position of its swing motion, said pointer including a curve in its form, said curve being of similar direction as the circumference of said spool, an indicator plate forward of said spool, and said pointer having a reverse direction of its form at its outer end adjacent said indicator plate when said pointer is in position outside the said line of said flanges.

ROBT. A. GALLY.

Witnesses:
PAUL HEUGGE,
NORMA KEISER.

Copies of this patent may be obtained for five cents each, by addressing the "Commissioner of Patents, Washington, D. C."